Feb. 21, 1956 H. W. RAHN 2,735,750
METHOD OF REDUCING THE CHLORATE CONTENT OF AQUEOUS
ALKALI METAL HYDROXIDE WHICH CONTAINS CHLORATE
Filed March 11, 1950
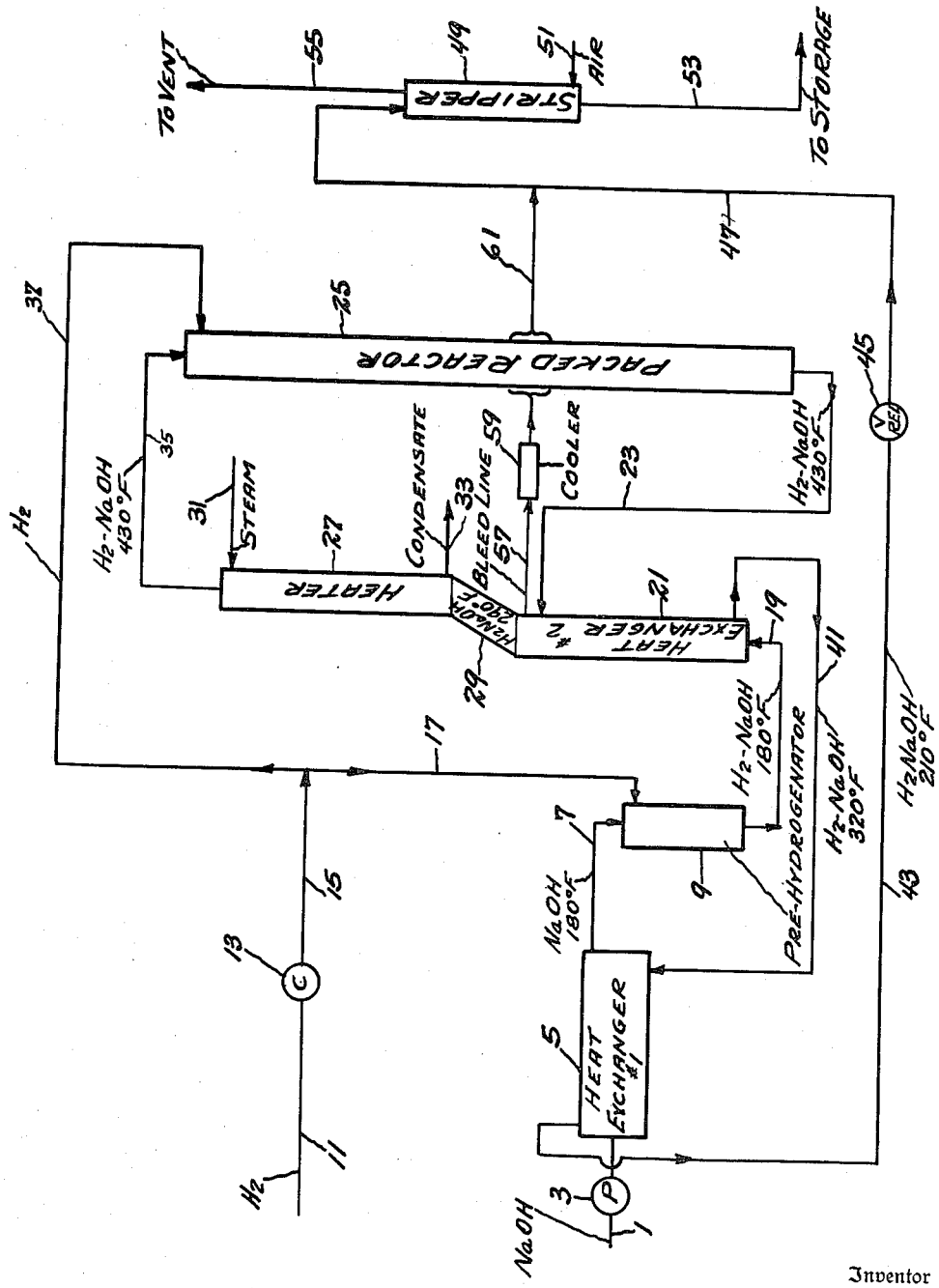
Inventor
HENRY W. RAHN
By
Olen E. Bee
Attorney

United States Patent Office 2,735,750
Patented Feb. 21, 1956

2,735,750

METHOD OF REDUCING THE CHLORATE CONTENT OF AQUEOUS ALKALI METAL HYDROXIDE WHICH CONTAINS CHLORATE

Henry W. Rahn, Corpus Christi, Tex., assignor to Columbia-Southern Chemical Corporation, a corporation of Delaware Application March 11, 1950, Serial No. 149,043

8 Claims. (Cl. 23—184)

This invention relates to the removal of chlorate and metallic impurities from alkali metal hydroxide.

Alkali metal hydroxides as produced by some procedures may, and commonly do, contain small amounts of chlorate, presumably in the form of chlorate of the alkali metal. Such chlorate appears, for example, in aqueous solutions of sodium and potassium hydroxides produced by electrolysis of the corresponding chlorides in conventional types of diaphragm cells. Such chlorate is formed, as is known, as a result of electrolytic cell reactions. The presence of this chlorate impurity is decidedly objectionable. One reason is that its presence in the amounts normally encountered precludes the use of the hydroxide in the rayon industry. Furthermore, experience has shown that chlorate present in aqueous alkali hydroxide is responsible for severe corrosion of iron and nickel equipment used for concentration or storing the solutions. Consequently, the concentrated or solid caustic becomes contaminated with undesired iron or nickel compounds that may render it off-color and militate against its use for certain purposes. Also, such attack of concentrating equipment increases the production cost of such hydroxides due to the necessity for repair or replacement of equipment that would be unnecessary if the material were chlorate-free. Metallic impurities also are common in caustic soda solutions and, where present in excessive amounts, must be removed.

According to this invention, I have discovered that chlorate may be removed from alkali metal hydroxide solutions by contacting an aqueous solution, preferably containing not substantially in excess of 75 percent by weight of alkali metal hydroxide, with atomic or molecular hydrogen pressure and a temperature in excess of 125° C. and preferably at a superatmospheric pressure. I have found that by such treatment of aqueous alkali metal hydroxide solutions which contain in excess of 0.01 percent by weight of chlorate, based upon the weight of alkali metal hydroxide in solution, the chlorate may be largely or even completely removed within a relatively short period of treatment. I have further found that color normally present in such electrolytic caustic is appreciably improved by this process.

The process preferably is conducted in the presence of a hydrogenation catalyst. However, introduction of catalyst is not absolutely necessary since, in most cases, alkali metal hydroxides contain impurities, notably nickel, in small concentrations, and where the alkali metal hydroxide is subjected to the hydrogenation treatment in the presence of a large solid surface area, metallic nickel tends to deposit from the solution upon the surface and thus tends to catalyze further hydrogenation. Hence, the reaction may be initiated without recourse to catalyst, if desired. Other catalysts which are capable of use in catalytic hydrogenation operations may be used. Such catalysts include the metals of the eighth group of the periodic system, for example, palladium, cobalt, nickel, ruthenium, osmium, rhodium, iridium and platinum. These metals in use, however, tend to become coated with nickel which is deposited from the alkali metal solution which generally contains nickel, and thus it appears that after an appreciable period of operation, with such solutions, nickel is present as an operative catalyst.

The process may be conducted simply by pumping hydrogen into a pool of aqueous caustic soda solution containing chlorate, thereby to establish a superatmospheric pressure, and heating the solution. The process also may be conducted in a continuous manner by pumping hydrogen into a pressure reactor, continuously introducing aqueous caustic soda containing chlorate in an upper or lower portion of the reactor, and withdrawing purified caustic soda solution from the other end of the reactor.

The accompanying drawing diagrammatically illustrates an embodiment of the invention in which the hydrogen treatment is effected in a continuous manner. As illustrated in this drawing, aqueous sodium hydroxide solution, containing for example approximately 50 percent by weight of NaOH and 0.1 to 0.2 percent by weight of chlorate, on the anhydrous basis, is supplied through line 1 to heat exchanger 5 by means of a pressure pump 3 which delivers the caustic soda solution to the heat exchanger against an elevated pressure, for example, 260 pounds gauge per square inch. This caustic solution passes through the heat exchanger 5 where it is heated to a suitable temperature, for example, 180° F., and thereafter is delivered through line 7 to a pre-hydrogenator 9.

Gaseous hydrogen is delivered through line 11 to a compressor 13 and thence through lines 15 and 17 to the pre-hydrogenator.

The pre-hydrogenator may be of any convenient construction which will facilitate intimate contact between the hydrogen and the aqueous caustic in order to permit rapid saturation of the aqueous caustic. Suitably, it may comprise a cylinder capable of withstanding the pressures utilized, packed with conventional packing, for example, ½ inch graphite Raschig rings. The caustic soda solution and the hydrogen are intimately mixed in the pre-hydrogenator and thereafter pass through line 19 to a second heat exchanger 21. The hydrogen-caustic soda solution is passed in heat-exchange relationship to dechlorated caustic soda in counter-current flow which is supplied to the heat exchanger 21 through line 23 coming from reactor 25. The hydrogen-sodium hydroxide solution emanates from heat exchanger 21 at an elevated temperature, for example, 290° F., and is delivered to heater 27 through a spool piece 29 which connects each tube of the heat exchanger 21 with a tube of the heater 27. Heater 27 is heated by convenient means, such as steam, which enters the shell of the heater through line 31, condensate being discharged through line 33. The hydrogen-caustic soda solution is further heated during passage through this heater, and ultimately flows through line 35 to the top of reactor 25.

The reactor 25 is of conventional construction, being an elongated cylinder packed with a suitable packing, for example, nickel Raschig rings. Both the hydrogen and the hydrogen-caustic soda solution are supplied to the upper portion of the tower and the solution allowed to trickle or percolate through the packing downwardly in a hydrogen atmosphere to the bottom of the tower where the caustic soda collects as a pool. The height of the column and the rate of downward flow are adjusted so that the caustic soda solution remains in the tower for a substantial period of time, for example, ½ to 30 minutes.

Treated caustic soda which has been dechlorated collects at the bottom of the reactor. This solution is withdrawn through line 23 and is passed in heat-exchange relationship with incoming hydrogen-caustic soda solution into exchanger 21, as has been previously described. Following this heat-exchange operation, the treated sodium hydroxide solution is withdrawn from the heat exchanger 21 through line 41 and is delivered to heat exchanger 5 where it is cooled to approximately 210° F. by heat-exchange with incoming caustic soda solution, as previously described. Thereafter, the solution is passed through line 43, through the pressure release valve 45 to reduce the pressure on the caustic soda solution to atmospheric, thence through line 47 to the top of a stripping column 49 where it flows in countercurrent contact with a stream of air introduced at the bottom of the column through line 51. The stripped and purified caustic soda solution is withdrawn from the bottom of the stripper column through line 53 and is delivered to storage. Air rising through the column strips the hydrogen from the caustic soda solution and is vented through line 55 to the atmosphere or to other suitable means for discharge of the resulting air-hydrogen mixture. At the top of the heat exchanger 21, a bleed line is provided leading from the shell of the heat exchanger 21 through a cooler 59 and thence through line 61 to line 47 where it is delivered to the top of the stripper column. Entrained hydrogen released from the caustic soda solution as it is cooled collects in the upper portion of the shell, and thus a portion of the caustic soda solution in the shell discharges through line 57 carrying with it this hydrogen.

It will be understood that various pressure valves and pumps together with various safety devices of conventional character, none of which are shown, may be used in order to establish the pressures required in the various units of the system and to provide proper safety precautions. For example, it has been found convenient to supply hydrogen through line 37 to reactor 25 at a pressure substantially below (25–50 pounds per square inch below) that at which hydrogen is supplied through line 17 to the prehydrogenator 9. In this way, the prehydrogenated caustic soda solution is raised through heat exchangers 21 and 27 by virtue of the differential pressure. It will also be understood that various other systems for establishing contact of hydrogen with the caustic soda solution at an elevated temperature may be used. For example, the process may be conducted as a batch operation simply by pumping hydrogen and caustic soda solution into a tank capable of withstanding substantial elevated pressure, and heating the solution for the required period of time.

The temperature of treatment has a very material effect upon the rate at which the destruction of chlorate is effected by hydrogen. The following tests were run, in which the hydrogen pressure was maintained at 150 pounds per square inch.

In each test, 200 cubic centimeters of aqueous sodium hydroxide containing the amount of NaOH and chlorate designated in Table I below were placed in a rocking nickel lined Parr bomb which had been previously purged with nitrogen to remove air. Hydrogen was introduced to establish a hydrogen pressure of 150 pounds per square inch in the bomb, the temperature of the bomb adjusted to the temperature set forth in Table I below and maintained at the designated temperature for the time designated while rocking the bomb at a constant rate. Thereafter the bomb was cooled, the pressure released and the contents analyzed for chlorate.

The following table sets out data which were obtained in this manner:

Table I

Hydrogen Pressure—150 pounds per square inch.
Total Pressure—Autogenous pressure of system.

| Temperature of Treatment (° C.) | NaOH Concentration, Percent by weight | Initial Chlorate Concentration, Percent by weight based on solids in solution | Time of Treatment (Hours) | Percent of Chlorate Removed |
|---|---|---|---|---|
| 30 | 50.4 | 0.066 | 1.0 | 0 |
| 180 | 50.4 | 0.066 | 1.0 | 62 |
| 218 | 50.4 | 0.066 | 0.5 | 100 |
| 218 | 50.4 | 0.066 | 0.75 | 100 |
| 140 | 50.4 | 0.066 | 2.0 | 50 |
| 140 | 11.2 | 0.25 | 1.0 | 40 |
| 120 | 11.2 | 0.25 | 1.0 | 22 |
| 120 | 29.9 | 0.122 | 1.0 | 25 |
| 218 | 7.9 | 26.9 | 1.0 | 80–100 |
| 218 | 69.1 | 0.085 | 1.0 | 56 |
| 218 | 69.1 | 0.085 | 1.75 | 100 |
| 265 | 92.1 | 0.105 | 0.5 | 33 |

From the above table, it will be apparent that the rate of removal of chlorate is materially affected by temperature. For example, notwithstanding the fact that the hydrogen pressure was 150 pounds per square inch, no detectable amount of chlorate was removed at 30° C. from a caustic soda solution containing 50.4 percent NaOH and 0.066 percent chlorate (based upon solid NaOH in solution) within 1 hour. On the other hand, when the temperature was raised to 140° C., 50 percent of the chlorate was removed within 2 hours, and when the temperature was raised to 218° C., substantially 100 percent of the chlorate was removed in 0.5 hour and also in 0.75 hour.

The following table illustrates the relative rate of chlorate removal from an aqueous solution of caustic soda containing 50 percent NaOH, in a continuous process such as that described above and illustrated in the drawing, at various temperatures when the hydrogen pressure is maintained at 150 pounds per square inch, the rate of removal at 218° C. being considered unity:

Table II

| Temperature (° C.) | Relative Rate (218° C.—1.00) |
|---|---|
| 30 | 0.0015 |
| 50 | 0.004 |
| 71 | 0.012 |
| 97 | 0.031 |
| 122 | 0.055 |
| 143 | 0.15 |
| 162 | 0.25 |
| 182 | 0.42 |
| 218 | 1.00 |
| 253 | 2.02 |
| 282 | 3.39 |

Thus, at 122° C., the time required for removal of chlorate is approximately 18 times the time for removal of chlorate at 218° C.

From the above data, it will be apparent that removal of chlorate at temperatures below about 125° C. is extremely slow and is, in general, so slow as to be impractical. In order to conduct the dechlorating operation rapidly and in a continuous process, such as that disclosed herein, it is generally necessary to maintain the temperature above about 180° C., the general range of operation being about 180 to 300° C. Higher temperatures are permissible. However, corrosion problems increase as the temperature of the caustic soda solution is increased, and thus the temperature rarely should exceed 400° C.

To obtain rapid chlorate reduction, it has been found necessary to conduct the process at a superatmospheric pressure although chlorate reduction occurs but at a slower rate at atmospheric pressure when solutions having a boiling point above 125–180° C. are treated. In general, any pressure in excess of about 25 pounds per square inch is suitable, and in most cases, the process is conducted at the autogenous pressure of the system. A partial pressure of at least about 4 to 5 pounds of hydrogen is found desirable in order to conduct the dechloration at a sufficiently rapid rate. Where it is desired to effect the dechloration in a continuous process, such as herein described, within a relatively short period of treatment, it is found advantageous to utilize hydrogen partial pressures in excess of about 25 pounds per square inch. Such pressures are advantageous to prevent corrosion of the equipment in which treatment is effected. Thus, in heating caustic solutions to elevated temperature, some chlorate becomes decomposed by thermal decomposition. However, unless hydrogen is present the heating equipment becomes corroded. Hence the hydrogen serves the additional function of permitting thermal decomposition of chlorate without corrosion. The following table tabulates the relative rate of chlorate removal from aqueous caustic soda solutions containing 50 per cent NaOH at various hydrogen pressures, with reference to the rate of removal of chlorate from such caustic soda solution at 218° C. and 150 pounds hydrogen pressure:

Table III

| Partial pressure of Hydrogen, p. s. i. | Relative Rate (150 p. s. i.= 1.00) |
|---|---|
| 4 | 0.22 |
| 10 | 0.42 |
| 20 | 0.61 |
| 40 | 0.79 |
| 100 | 0.95 |
| 150 | 1.00 |
| 300 | 1.05 |
| 800 | 1.08 |

These data were obtained in a continuous process of the type illustrated using ½" x ½" x 1/32" nickel Raschig rings as packing in the reactor column.

From Table III, it will be apparent that the rate of removal of chlorate from 50 per cent caustic is approximately 5 times faster when the hydrogen pressure is 150 pounds per square inch than when the hydrogen pressure is 4 pounds per square inch. Substantial increase above 150 pounds per square inch does not materially increase the rate of chlorate removal with Raschig rings of this size. Using rings having proportionately greater surface area per unit weight, e. g., ¼" x ¼" x 1/32" rings, material increase in rate of chlorate removal has been achieved by raising the hydrogen partial pressure to 250–300 pounds per square inch. Higher pressures may be used if desired.

While chlorate removal may be effected by treatment of alkali metal hydroxide solutions of any concentrations, it has been found that the rate of removal is materially slower when the alkali metal concentration is above about 70 to 73 per cent NaOH, based upon the total weight of the solution. Consequently, it is preferred to treat solutions having a concentration not in excess of 70 to 73 per cent by weight of NaOH. For continuous operation where rapid dechloration is especially advantageous, it has been found preferable to treat aqueous solutions containing 30 to 60 per cent by weight of NaOH, based upon the total weight of solution.

It will be apparent from the above tables that the time of treatment required to remove chlorate is dependent materially upon the temperature of treatment, the hydrogen partial pressure, and the concentration of the sodium hydroxide solution. Using optimum sodium hydroxide concentration, temperature and hydrogen pressure as has been set forth above, the chlorate may be substantially completely removed within ½ to 20 minutes. On the other hand, times as long as 2 to 20 hours may be necessary in order to effect the desired chlorate reduction. In general, the solution should be subjected to the action of hydrogen until the chlorate is completely destroyed or at least does not exceed more than 0.05 per cent, based upon the solid alkali metal hydroxide in solution. Normal operation, in accordance with the continuous process described herein and illustrated in the accompanying drawing, results in the reduction of the chlorate content to 0.001 to 0.005 per cent or even complete destruction of chlorate, in treating solutions containing 0.3 to .50 per cent by weight of sodium chlorate based upon the solid sodium hydroxide in the solution.

Color also is reduced in intensity by the process herein described. Thus caustic soda solution produced in conventional diaphragm cells normally has a blue color. After treatment by the present process the solution becomes colorless or slightly yellow, having little intensity.

In addition, the hydrogen treatment herein described materially reduces the tendency of the caustic soda solution to fluoresce.

While the invention has been described with particular reference to the treatment of sodium hydroxide solutions, it will be understood that the method herein described is equally applicable to solutions of other alkali metal hydroxides, including potassium hydroxide, lithium hydroxide, etc.

Although the present invention has been described with reference to specific details of certain embodiments thereof, it is not intended that such embodiments shall be regarded as limitations upon the scope of the claims except insofar as included in the accompanying claims.

This invention is a continuation-in-part of my application, Serial No. 782,231, filed October 25, 1947, now abandoned.

I claim:

1. The method of reducing chlorate content of aqueous sodium hydroxide solution containing chlorate, which comprises introducing hydrogen in elemental state into the solution and heating the sodium hydroxide solution containing hydrogen at a temperature not less than 125° C. in the presence of an eighth group metal hydrogenation catalyst until the chlorate has been substantially reduced.

2. The method of reducing the chlorate content of aqueous sodium hydroxide solution containing chlorate, which comprises introducing hydrogen in elemental state into the sodium hydroxide solution and heating the solution containing hydrogen in the presence of nickel at a superatmospheric pressure, the hydrogen pressure being not less than 25 pounds per square inch, and at a temperature not less than 180° C.

3. The method of reducing the chlorate content of aqueous sodium hydroxide solution produced by electrolysis of sodium chloride solution, which comprises concentrating the solution to a concentration of 30 to 60 per cent NaOH by weight, and introducing hydrogen into the concentrated solution and heating the sodium hydroxide solution in the presence of the introduced hydrogen and in the presence of nickel at a superatmospheric pressure and a temperature above 125° C.

4. A method of reducing the chlorate content of an aqueous alkali metal hydroxide solution containing chlorate, which comprises introducing hydrogen in elemental state into the solution and heating the solution containing hydrogen at a temperature not less than 125° C. until the chlorate content thereof has been substantially reduced.

5. The process of claim 4 wherein the alkali metal hydroxide is potassium hydroxide.

6. A method of removing chlorate and nickel from an aqueous sodium hydroxide solution containing the same, which comprises introducing hydrogen in elemental state into the aqueous sodium hydroxide solution and heating the solution containing hydrogen at a superatmospheric pressure while in contact with solid packing at a temperature above 125° C. until the nickel and chlorate contents have been substantially reduced.

7. The method of reducing the chlorate content of a caustic soda solution, of a concentration from about 8% to about 75% in caustic soda, containing not more than 10 parts of chlorate per 1000 parts of caustic soda, which comprises introducing gaseous hydrogen in the elemental state into the said solution and in the presence of a hydrogen activating nickel catalyst until the chlorate content has been substantially reduced.

8. A method of reducing the chlorate content of an aqueous alkali metal hydroxide containing chlorate which comprises introducing elemental hydrogen into said solution and heating the alkali metal hydroxide solution containing hydrogen at a temperature not less than 125° C. in the presence of an eighth group metal hydrogenation catalyst until the chlorate content thereof has been substantially reduced.

References Cited in the file of this patent

UNITED STATES PATENTS

| | | |
|---|---|---|
| 1,426,517 | Sulzkerger | Aug. 22, 1922 |
| 1,783,662 | Marx et al. | Dec. 2, 1930 |
| 2,142,670 | Eichelberger | Jan. 3, 1939 |
| 2,404,453 | Osborne | July 23, 1946 |
| 2,470,305 | Gross | May 17, 1949 |
| 2,647,828 | McGauley | Aug. 4, 1953 |

FOREIGN PATENTS

| | | |
|---|---|---|
| 211,669 | Germany | Jan. 19, 1907 |

OTHER REFERENCES

J. W. Mellor: "A Comprehensive Treatise on Inorganic and Theoretical Chem.," vol. 1, pages 320, 330. Longmans, Green and Company, N. Y.